United States Patent
Georgakopoulos

(10) Patent No.: US 10,038,345 B1
(45) Date of Patent: Jul. 31, 2018

(54) SMART CLOTHES WITH WIRELESS POWER TRANSFER AND SENSING CAPABILITIES

(71) Applicant: Stavros Georgakopoulos, Boca Raton, FL (US)

(72) Inventor: Stavros Georgakopoulos, Boca Raton, FL (US)

(73) Assignee: The Florida International University Board of Trustees, Miami, FL (US)

(*) Notice: Subject to any disclaimer, the term of this patent is extended or adjusted under 35 U.S.C. 154(b) by 0 days.

(21) Appl. No.: 15/800,360

(22) Filed: Nov. 1, 2017

(51) Int. Cl.
| | |
|---|---|
| *H01F 27/42* | (2006.01) |
| *H01F 37/00* | (2006.01) |
| *H01F 38/00* | (2006.01) |
| *H02J 50/40* | (2016.01) |
| *A41D 1/04* | (2006.01) |
| *A41D 1/00* | (2018.01) |
| *H02J 50/12* | (2016.01) |

(52) U.S. Cl.
CPC .............. *H02J 50/40* (2016.02); *A41D 1/002* (2013.01); *A41D 1/04* (2013.01); *H02J 50/12* (2016.02)

(58) Field of Classification Search
CPC .......... H02J 50/40; H02J 50/12; A41D 1/002; A41D 1/04
USPC ........................................................ 307/104
See application file for complete search history.

(56) References Cited

U.S. PATENT DOCUMENTS

| | | | | |
|---|---|---|---|---|
| 2012/0248888 | A1* | 10/2012 | Kesler | H03H 7/40 307/104 |
| 2015/0077296 | A1* | 3/2015 | An | H01Q 1/22 343/720 |

* cited by examiner

*Primary Examiner* — Carlos Amaya
(74) *Attorney, Agent, or Firm* — Saliwanchik, Lloyd & Eisenschenk

(57) ABSTRACT

A smart clothes system can include: a transmitter including a source loop, a first transmitter resonator surrounding the source loop, and a second transmitter resonator surrounding the first transmitter resonator; and a receiver including a load loop spaced apart from the source loop, a first receiver resonator surrounding the load loop, and a second receiver resonator surrounding the first receiver resonator. The transmitter can be configured to face the receiver such that it transmits power and receives data. The source loop, the first transmitter resonator, and the second transmitter resonator can be disposed on the same plane as each other, and the load loop, the first receiver resonator, and the second receiver resonator can be disposed on the same plane as each other.

19 Claims, 14 Drawing Sheets

SMART CLOTHES WITH WIRELESS POWER TRANSFER AND SENSING CAPABILITIES

GOVERNMENT SUPPORT

This invention was made with government support under Grant No. ECCS1307984 awarded by the National Science Foundation and grant No. W911NF-13-1-0149 awarded by the Army Research Office. The government has certain rights in the invention.

BACKGROUND

A variety of sensors can be attached on a human body or implanted into the human body to monitor or check the human body for various reasons. The sensors need power to operate, and they need to be frequently connected to a power source or have a battery replaced. These procedures are burdensome to the user of the sensors and require some time. Even though wireless power transfer (WPT) technology allows wireless power transfer to a receiver, such as one including a sensor, the current WPT technology requires the receiver to be positioned in a specific cite, thereby inhibiting the user of the sensor from moving.

BRIEF SUMMARY

Embodiments of the subject invention provide novel and advantageous smart clothes that wirelessly transfer power and communicate with a sensor attached on a human body.

In an embodiment, a smart garment can comprise a substrate, a source loop disposed on the substrate, and a transmitter resonator disposed on the substrate. The source loop and the transmitter resonator can be disposed on the same plane of the substrate.

In another embodiment, a smart clothes system can comprise: a transmitter including a source loop, a first transmitter resonator surrounding the source loop, and a second transmitter resonator surrounding the first transmitter resonator; and a receiver including a load loop spaced apart from the source loop, a first receiver resonator surrounding the load loop, and a second receiver resonator surrounding the first receiver resonator. The transmitter can be configured to face the receiver such that it transmits power and receives data.

In yet another embodiment, a smart clothes system can comprise: a vest; a plurality of transmitters attached to the vest; a battery attached to the vest and supplying power to the plurality of transmitters; a plurality of receivers configured to be attached to a body and facing the plurality of transmitters; and a sensor connected to the plurality of receivers. Each transmitter of the plurality of transmitters can comprise: a transmitter substrate; a source loop disposed on a top surface of the transmitter substrate; a first transmitter resonator disposed on the top surface of the transmitter substrate; and a second transmitter resonator disposed on the top surface of the transmitter substrate. Each receiver of the plurality of receivers can comprise: a receiver substrate; a load loop disposed on a top surface of the receiver substrate; a first receiver resonator disposed on the top surface of the receiver substrate; and a second receiver resonator disposed on the top surface of the receiver substrate. The battery can be connected to the source loop of each transmitter of the plurality of transmitters, and the sensor can be connected to the load loop of each receiver of the plurality of receivers.

BRIEF DESCRIPTION OF DRAWINGS

FIG. 1($b$) shows a receiver side of a smart clothes system according to an embodiment of the subject invention.

FIGS. 1($c$)-1($h$) show a smart clothes system including a transmitter side and a receiver side according to an embodiment of the subject invention.

FIG. 9($b$) shows a transmitter and a receiver of a smart clothes system according to an embodiment of the subject invention.

DETAILED DESCRIPTION

Figure 1A:
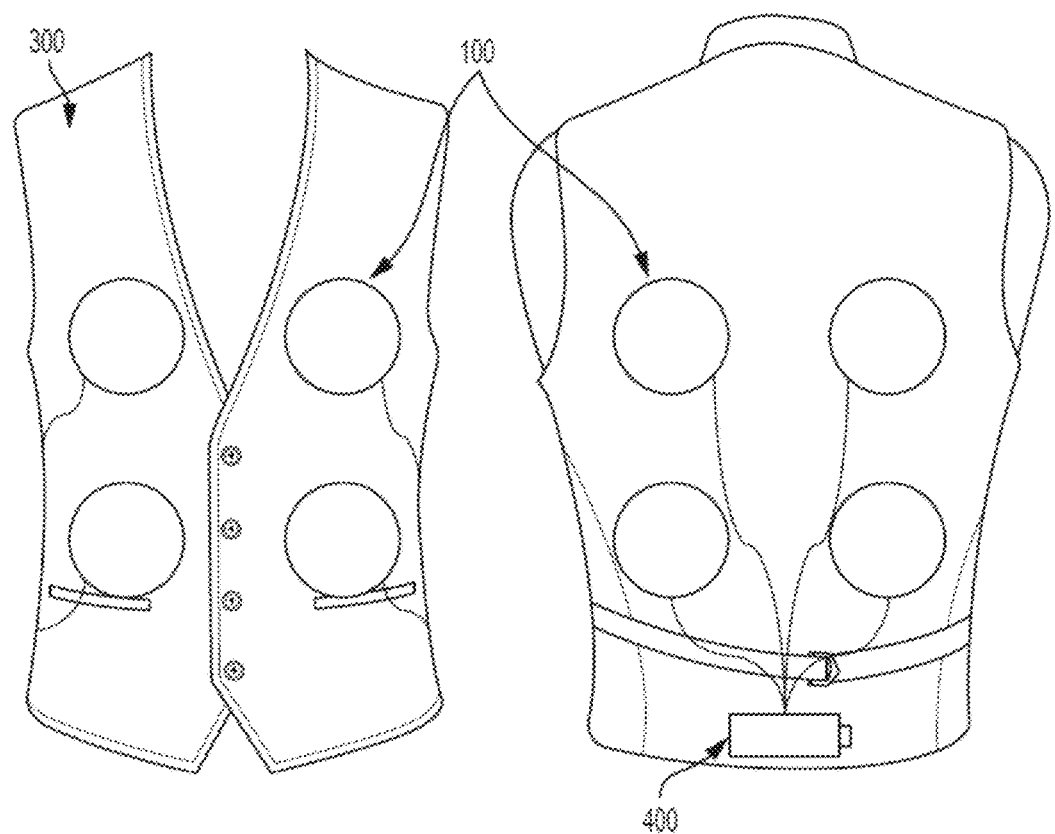
FIG. 1($a$) shows a transmitter side of a smart clothes system according to an embodiment of the subject invention.
Figure 1B:
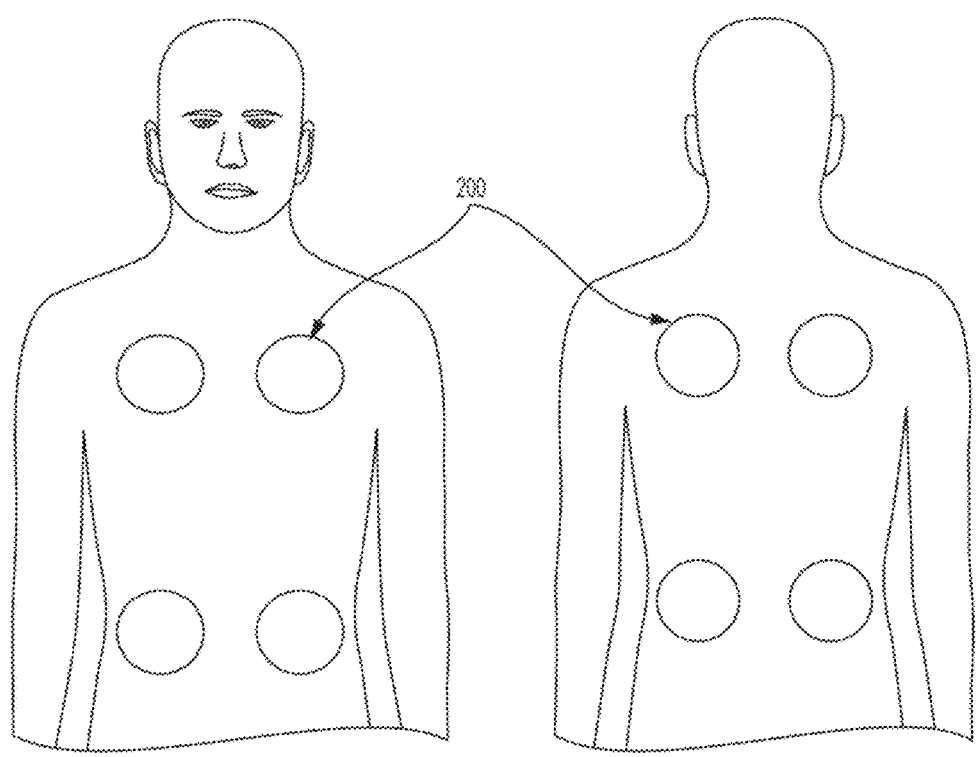
Figure 1C:
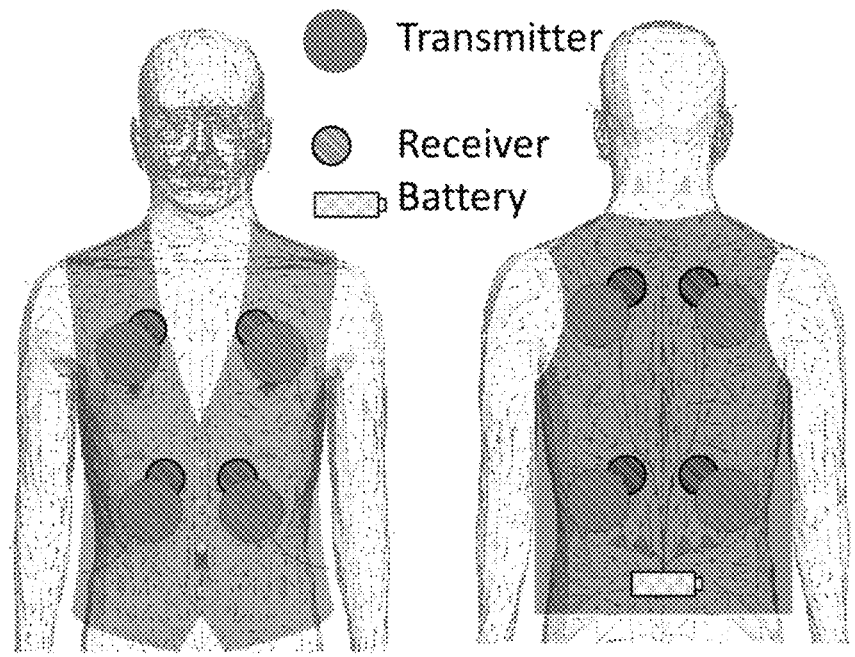
Figure 1D:
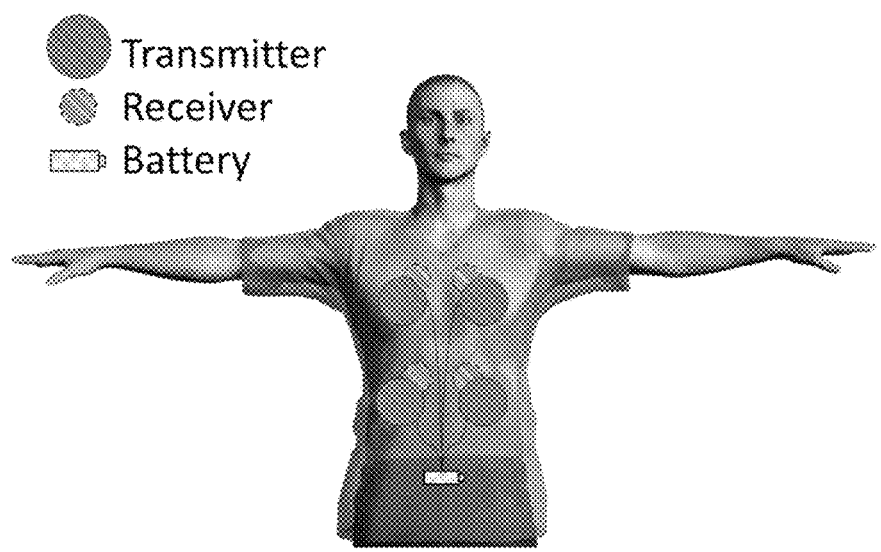
Figure 1E:
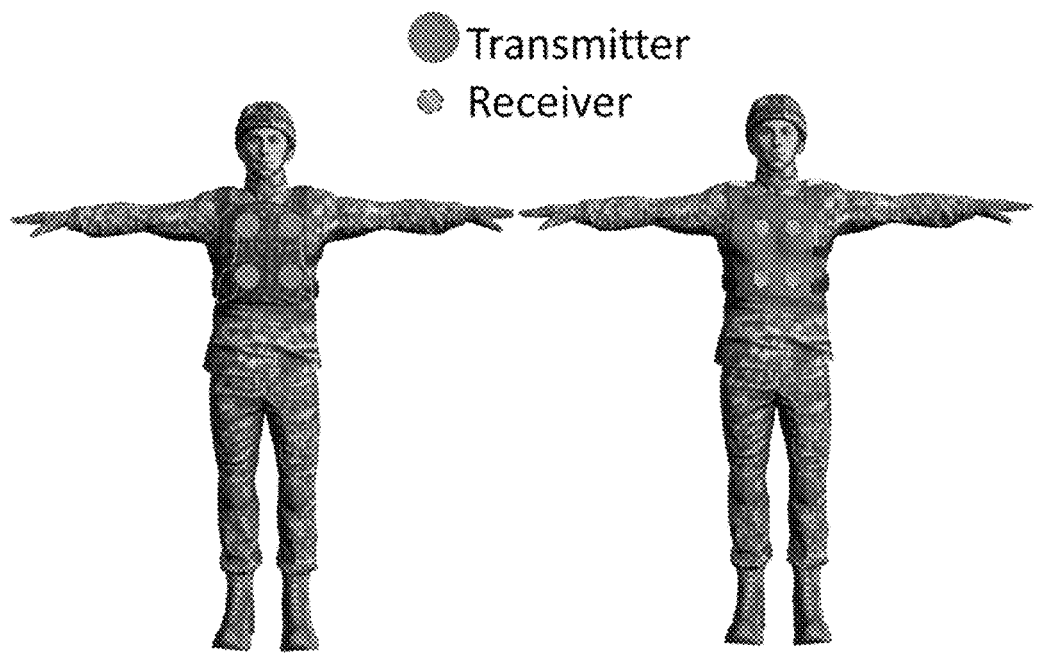
Figure 1F:
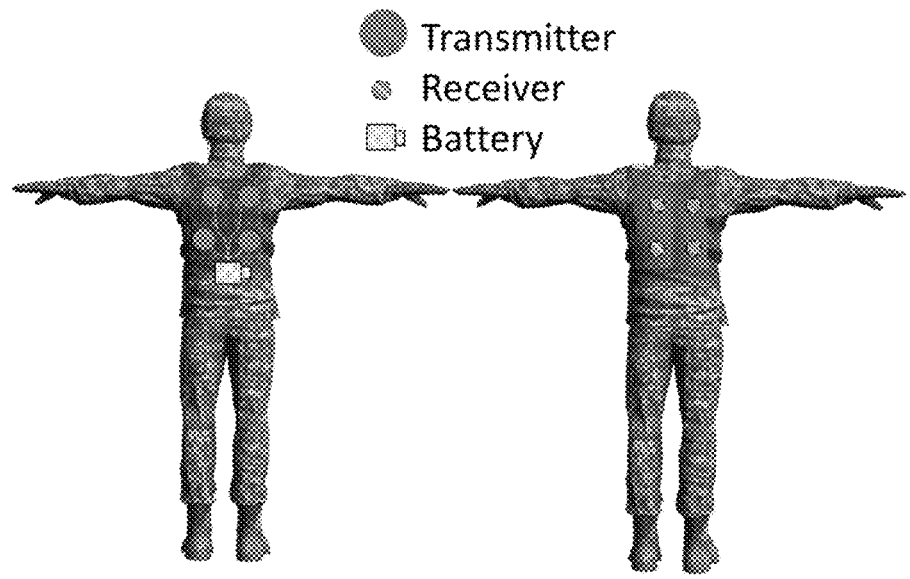
Figure 1G:
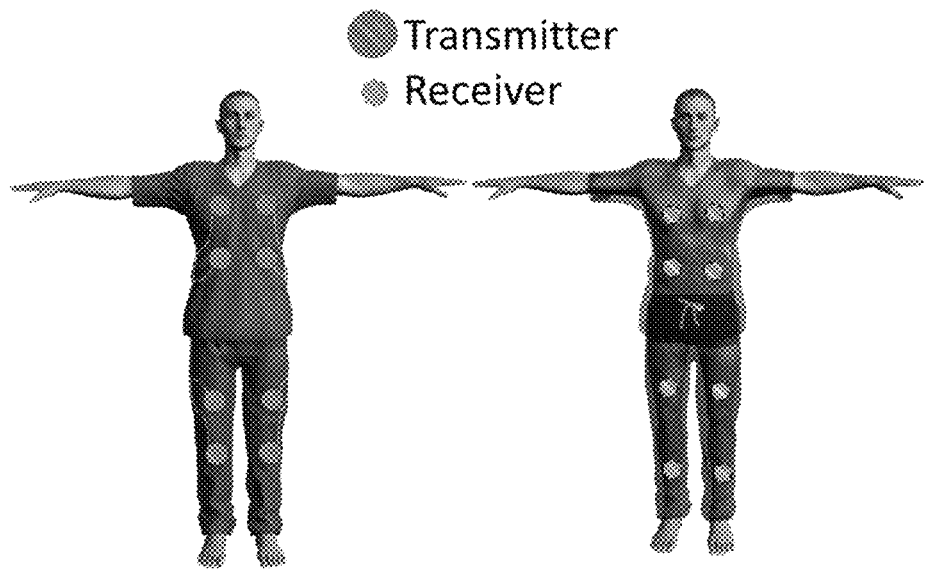
Figure 1H:
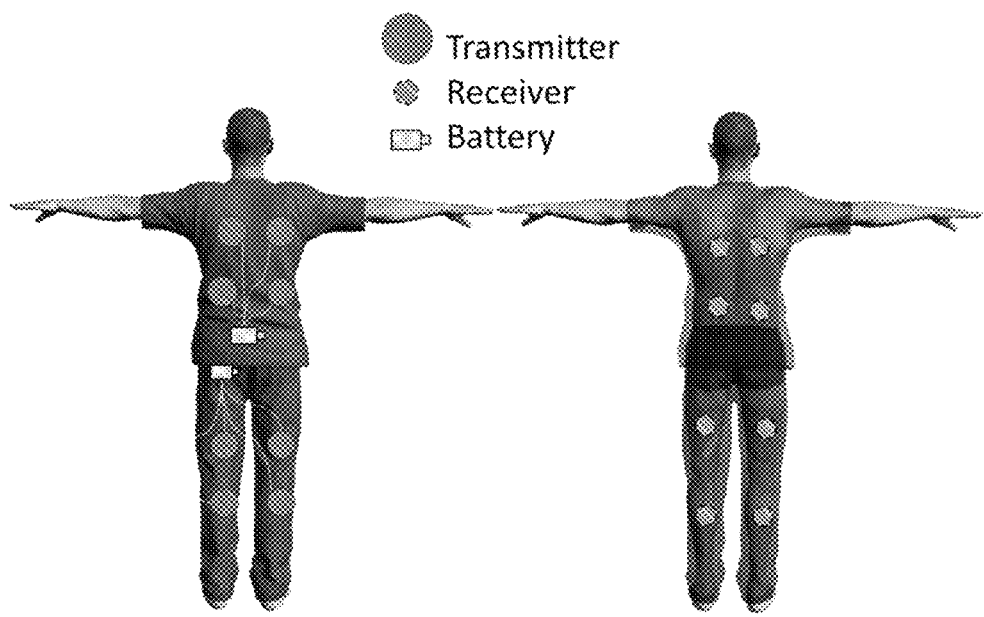

Embodiments of the subject invention provide novel and advantageous smart clothes that wirelessly transfer power and communicate with a sensor attached to a body of a user (e.g., on a human body). Smart clothes of embodiments of the subject invention, integrated with transmitters, wirelessly transmit power to sensor/devices affixed on the body (epidermal) or placed inside the body (implantable). In addition, the smart clothes can also bi-directionally or uni-directionally communicate with the sensor/devices affixed on the body. Smart clothes of embodiments of the subject invention can include vests, pants, and helmets, among other items, that are integrated with batteries and wireless power transmission and data elements (e.g., loops or cylindrical elements).

Certain embodiments include stickers that are attached on the body with sensors. These stickers can have the receiving WPT elements (e.g., loops) and the sensors. The stickers can be battery-less (i.e., have no battery for themselves). In an embodiment, a smart vest can have a battery that powers the integrated WPT loops that transmit power and data wirelessly to the stickers on the body. The wireless communication between the smart vest and the sticker(s) can be bi-directional or uni-directional. The smart clothes can power all the sensors on the body and collect their data.

In an embodiment, both receivers and transmitters can transmit and receive data. In an alternative embodiment, only receivers can receive data and only transmitters can transmit data. In yet another embodiment, only transmitters can receive data and only receivers can transmit data.

FIGS. 1($a$) and 1($b$) show a transmitter side and a receiver side of a smart clothes system according to an embodiment of the subject invention, respectively. FIGS. 1($c$)-1($h$) show a smart clothes system including a transmitter side and a receiver side according to an embodiment of the subject invention. Referring to FIGS. 1(a)-1(h), the smart clothes system can comprise a transmitter 100 transferring power, a receiver 200 receiving the power from the transmitter 100, a battery 400 providing the power to the transmitter 100, and a vest 300 including the transmitter 100 and the battery 400.

The transmitter 100 can wirelessly transfer power to the receiver 200, so the receiver 200 can use the power even if the receiver 200 is not directly connected to a power source such as a battery. In addition, the transmitter 100 can transmit and receive data with the receiver 200 at the same time.

The receiver 200 can include elements that simultaneously receive power and communicate, and the receiver 200 can have sensors or other devices attached on the (human) body of a user. The receiver 200 may have batteries or may be battery-less (i.e., without batteries). If the receiver 200 has batteries, the batteries can be recharged by the power supplied by the transmitter 100 through wireless power transfer. If the receiver 200 does not have batteries, the receiver 200 is powered by the transmitter 100 during operation.

The transmitter 100 can be configured to face the receiver 200 to increase the efficiency of the power transmitting and data communication. The transmitter 100 and the receiver 200 can be provided as a plurality of transmitters and receivers, respectively.

Figure 2:
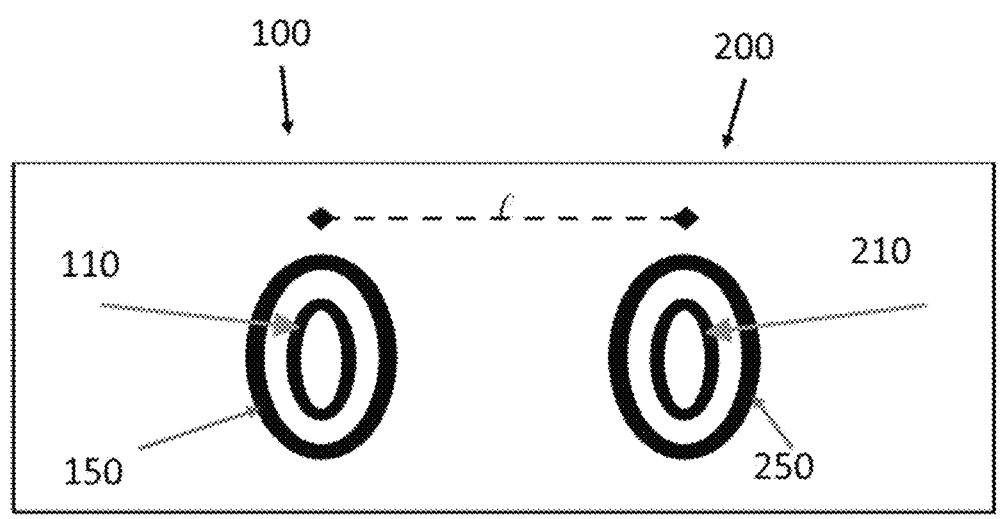
FIG. 2 shows a conformal WPT system according to an embodiment of the subject invention.

FIG. 2 shows a conformal WPT system according to an embodiment of the subject invention. A conformal highly efficient WPT system can comprise four elements (e.g., four loops, or two loops and two coils used for resonators). Referring to FIG. 2, the WPT system can comprise a source loop 110 configured to be connected to a power source, a transmitter resonator 150 transmitting power, a receiver resonator 250 receiving the power, and a load loop 210 configured to be connected to a load. Even though the transmitter 100 including the source loop 110 and the transmitter resonator 150 is spaced apart at a distance/from the receiver 200 including the load loop 210 the receiver resonator 250, the transmitter 100 efficiently transfers power to the receiver 200. This WPT system achieves high efficiency when the transmitter 100 and the receiver 200 are resonating at the same frequency, at which the resonators exhibit maximum Q-factor.

Figure 3:
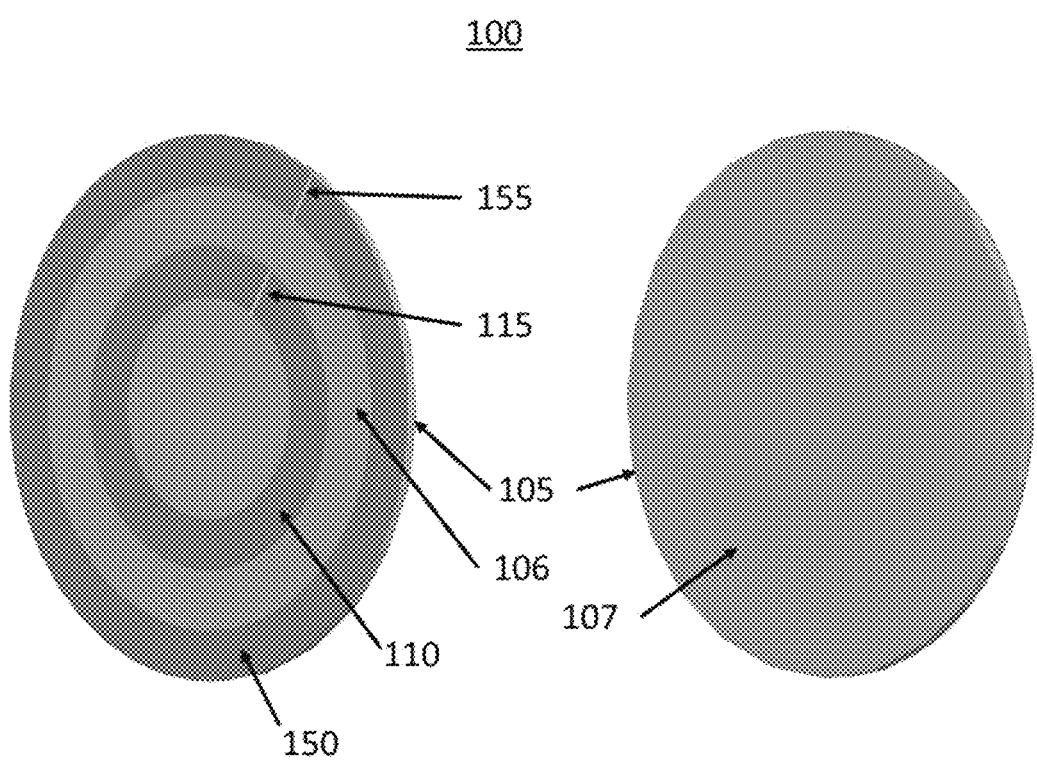
FIG. 3 shows a transmitter of a smart clothes system according to an embodiment of the subject invention.

FIG. 3 shows a transmitter of a smart clothes system according to an embodiment of the subject invention. Referring to FIG. 3, the transmitter 100 can be implemented by using the conformal highly efficient WPT system such that the transmitter 100 comprises a transmitter substrate 105, a source loop 110 disposed on a top surface 106 of the transmitter substrate 105, and a transmitter resonator 150 disposed on the top surface 106 of the transmitter substrate 105.

The source loop 110 and the transmitter resonator 150 can be disposed on the same plane of the top surface 106, and the source loop 110 can be positioned inside the transmitter resonator 150. The source loop 110 and the transmitter resonator 150 can be arranged to be concentric. The source loop 110 can have, for example, a circular shape disconnected at a source loop end 115 that functions as an input/output port. The transmitter resonator 150 can have, for example, a circular shape disconnected at a transmitter resonator end 155 that is configured to be connected to a lumped capacitor. The source loop 110 and the transmitter resonator 150 can have other shapes such as rectangular, though embodiments are not limited thereto. The transmitter substrate 105 can be made of, for example, a FR4 substrate and further comprises a bottom surface 107 opposite to the top surface 106.

Figure 4:
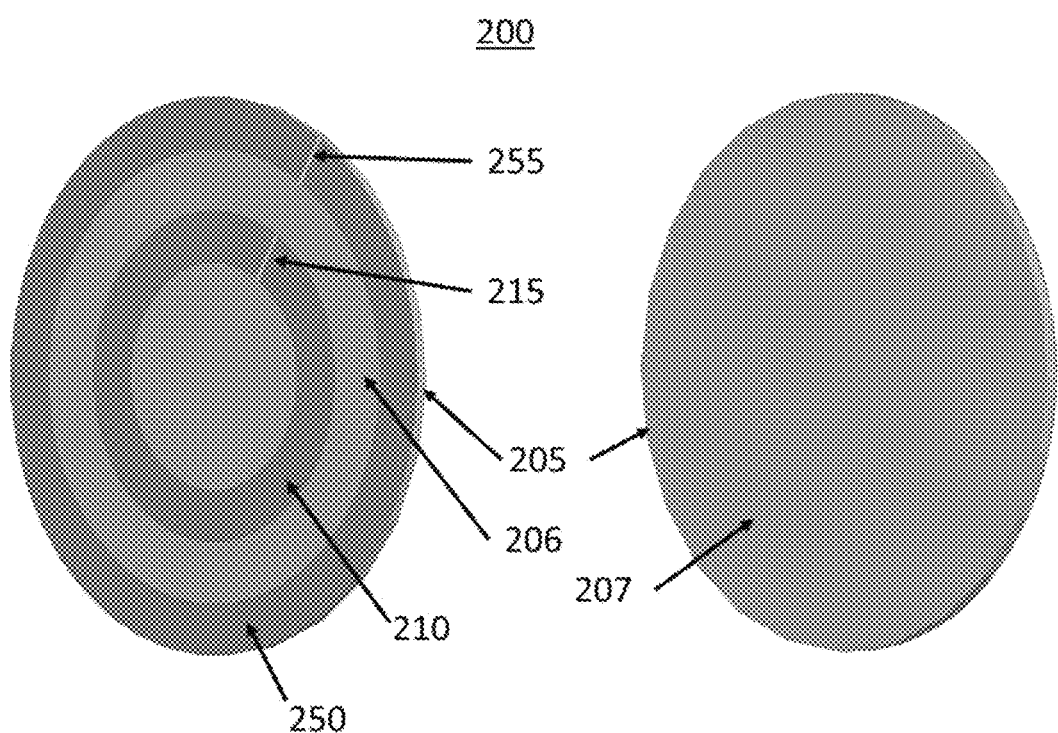
FIG. 4 shows a receiver of a smart clothes system according to an embodiment of the subject invention.

FIG. 4 shows a receiver of a smart clothes system according to an embodiment of the subject invention. Similar to the transmitter 100 of FIG. 3, the receiver 200 comprises a receiver substrate 205, a load loop 210 disposed on a top surface 206 of the receiver substrate 205, and a receiver resonator 250 disposed on the top surface 206 of the receiver substrate 205.

The load loop 210 and the receiver resonator 250 can be disposed on the same plane of the top surface 206 of the receiver substrate 205, and the load loop 210 can be positioned inside the receiver resonator 250. The load loop 210 and the receiver resonator 250 can be arranged to be concentric. The load loop 210 can have, for example, a circular shape disconnected at a load loop end 215 that functions as an input/output port. The receiver resonator 250 can have, for example, a circular shape disconnected at a receiver resonator end 255 that is configured to be connected to a lumped capacitor. The lad loop 210 and the receiver resonator 250 can have other shapes such as rectangular, though embodiments are not limited thereto. The receiver substrate 205 can be made of, for example, a FR4 substrate and further comprises a bottom surface 207 opposite to the top surface 206.

Figure 5:
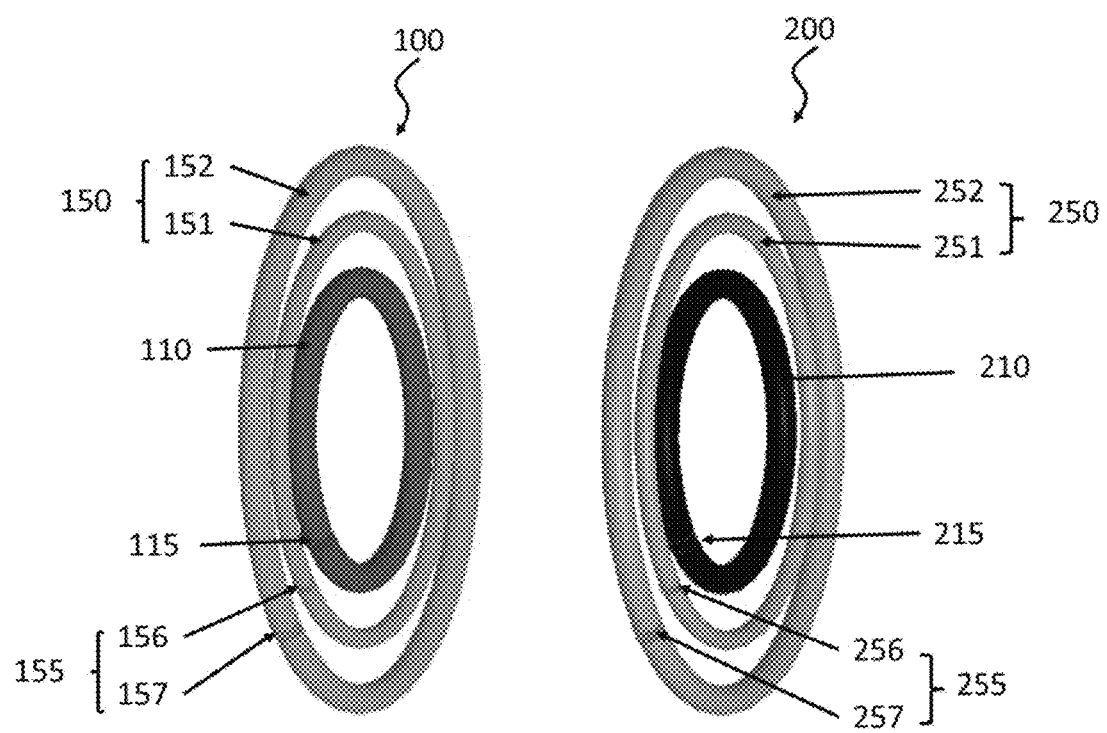
FIG. 5 shows a smart clothes system according to an embodiment of the subject invention.

FIG. 5 shows a smart clothes system according to an embodiment of the subject invention. Referring to FIG. 5, the transmitter 100 and the receiver 200 can comprise two resonators, respectively. One resonator of each of the transmitter 100 and the receiver 200 can be used to transmit/receive power and the other resonator of each of the transmitter 100 and the receiver 200 can be used to transmit/receive data.

The transmitter 100 can comprise a source loop 110 and a transmitter resonator 150 including a first transmitter resonator 151 and a second transmitter resonator 152. The source loop 110, the first transmitter resonator 151, and the second transmitter resonator 152 have a source loop end 115, a first transmitter resonator end 156, and a second transmitter resonator end 157, respectively. A transmitter resonator end 155 of the transmitter resonator 150 can comprise the first transmitter resonator end 156 and the second transmitter resonator end 157.

Similar to the transmitter 100, the receiver 200 can comprise a load loop 210 and a receiver resonator 250 including a first receiver resonator 251 and a second receiver resonator 252. The load loop 210, the first receiver resonator 251, and the second receiver resonator 252 can have a load loop end 215, a first receiver resonator end 256, and a second receiver resonator end 157, respectively. A receiver resonator end 255 of the receiver resonator 250 can comprise the first receiver resonator end 256 and the second receiver resonator end 257.

The first transmitter resonator 151 and the first receiver resonator 251 can be used for power transmitting, and the second transmitter resonator 152 and the second receiver resonator 252 can be used for data communication. Alternatively, it is possible that the first transmitter resonator 151 and the first receiver resonator 251 are used for data communication and the second transmitter resonator 152 and the second receiver resonator 252 are used for power transmitting.

Figure 6:
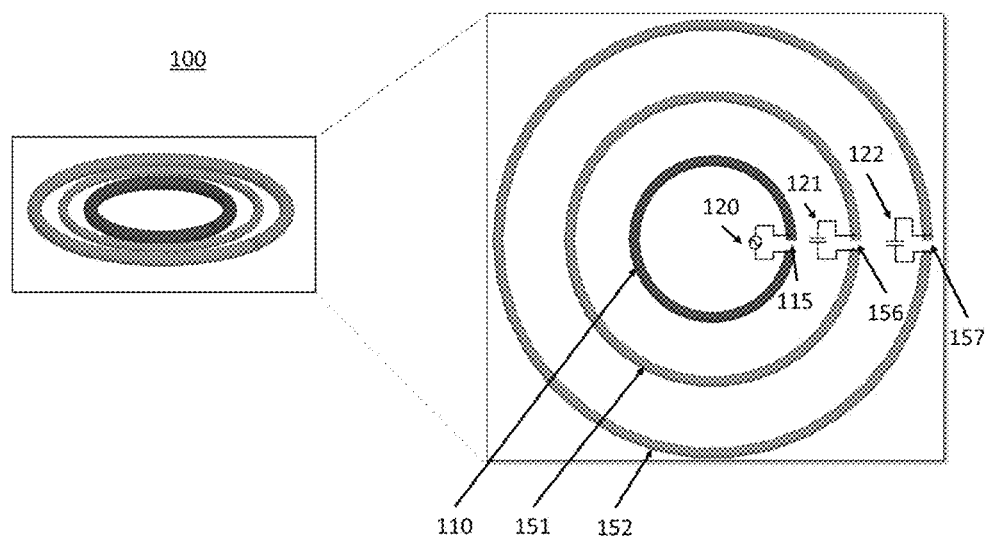
FIG. 6 shows a transmitter of a smart clothes system according to an embodiment of the subject invention.

FIG. 6 shows a transmitter of a smart clothes system according to an embodiment of the subject invention. Referring to FIG. 6, the source loop 110, the first transmitter resonator 151, and the second transmitter resonator 152 can be disposed on the same plane and are arranged concentric. The first transmitter resonator 151 can surround the source loop 110 and the second transmitter resonator 152 surrounds the first transmitter resonator 151.

The source loop 110 can include the source loop end 115 and can be configured to be connected to a power source 120 through the source loop end 115. The power source 120 can be a battery. The first transmitter resonator 151 can include the first transmitter resonator end 156 and can be connected to a first transmitter capacitor 121 through the first transmitter resonator end 156. Similarly, the second transmitter resonator 152 can include the second transmitter resonator end 157 and can be connected to a second transmitter capacitor 122 through the second transmitter resonator end 157. The first 121 and second 122 transmitter capacitors can be lumped capacitors.

Figure 7:
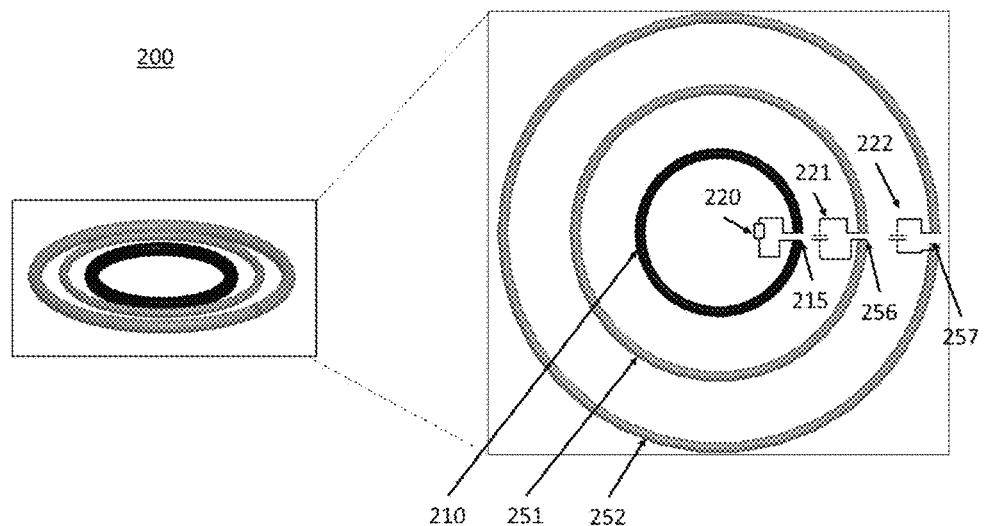
FIG. 7 shows a receiver of a smart clothes system according to an embodiment of the subject invention.

FIG. 7 shows a receiver of a smart clothes system according to an embodiment of the subject invention. Referring to FIG. 7, the load loop 210, the first receiver resonator 251, and the second receiver resonator 252 can be disposed on the same plane and can be arranged concentric. The first receiver resonator 251 can surround the load loop 210, and the second receiver resonator 252 can surround the first receiver resonator 251.

The load loop 210 can include the load loop end 215 and can be configured to be connected to a load 220 through the load loop end 215. The load 220 can be a sensor or a device that is configured to be affixed on a body or implanted in the body. The body can be, but is not limited to, a human body, an animal body, or a machine. The first receiver resonator 251 can include the first receiver resonator end 256 and can be connected to a first receiver capacitor 221 through the first receiver resonator end 256. Similarly, the second receiver resonator 252 can include the second receiver resonator end 257 and can be connected to a second receiver capacitor 222 through the second receiver resonator end 257. The first 221 and second 222 receiver capacitors can be lumped capacitors.

Figure 8:
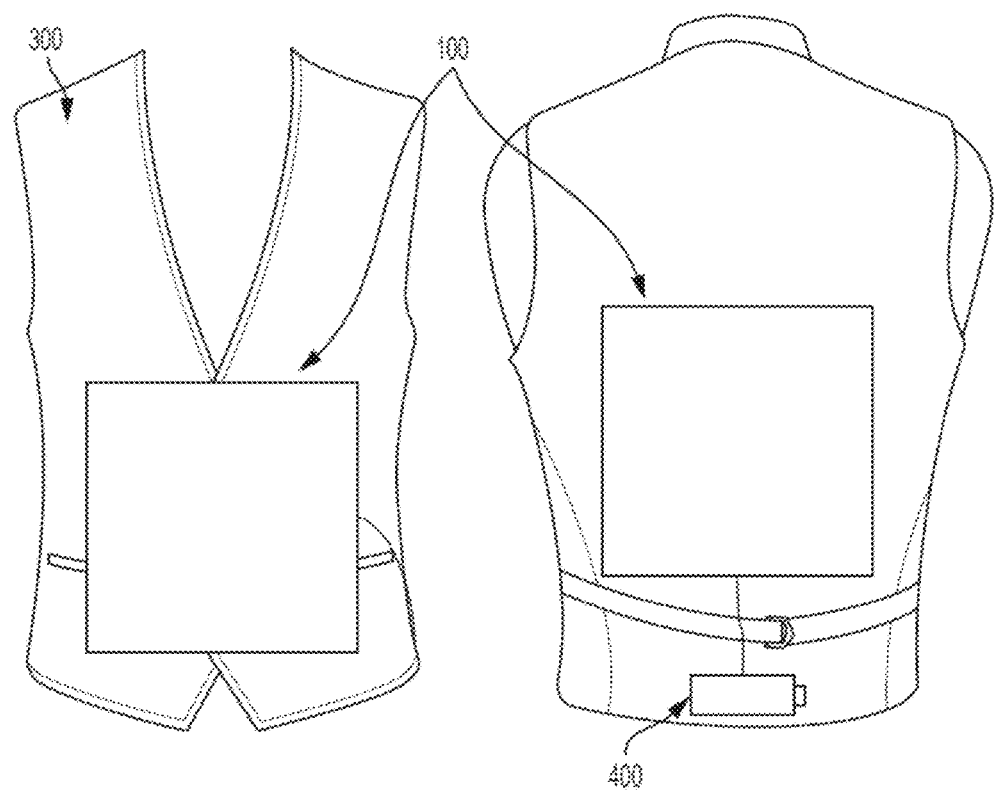
FIG. 8 shows a transmitter of a smart clothes system according to an embodiment of the subject invention.

FIG. 8 shows a transmitter of a smart clothes system according to an embodiment of the subject invention. Referring to FIG. 8, the transmitter 100 can be large such that one transmitter covers a plurality of receivers.

Figure 9A:
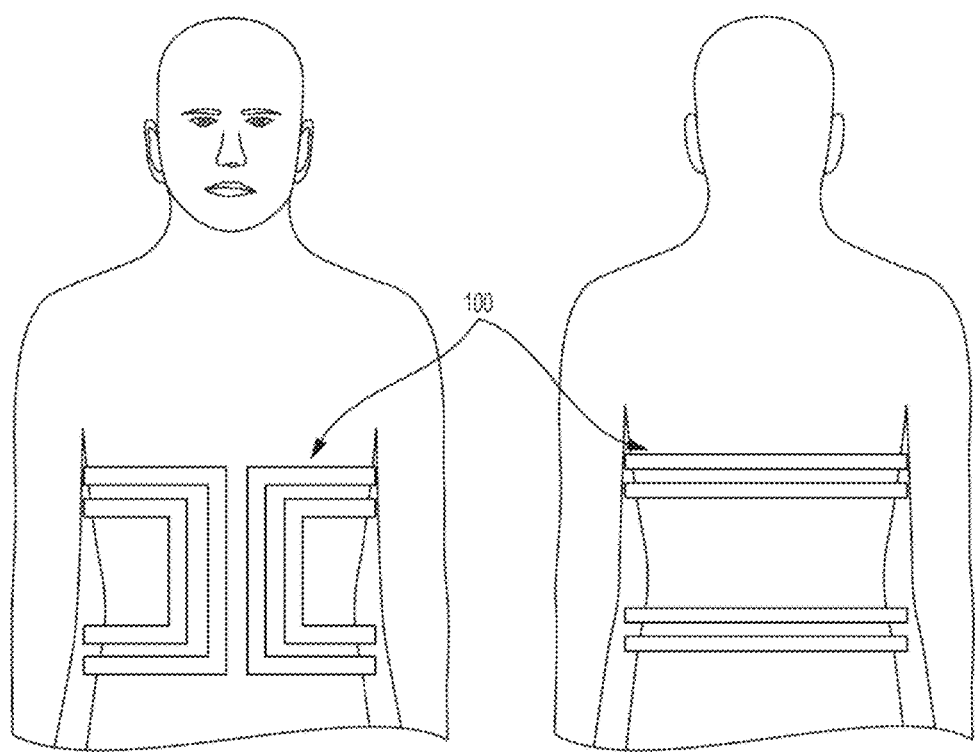
FIG. 9($a$) shows a transmitter of a smart clothes system according to an embodiment of the subject invention.
Figure 9B:
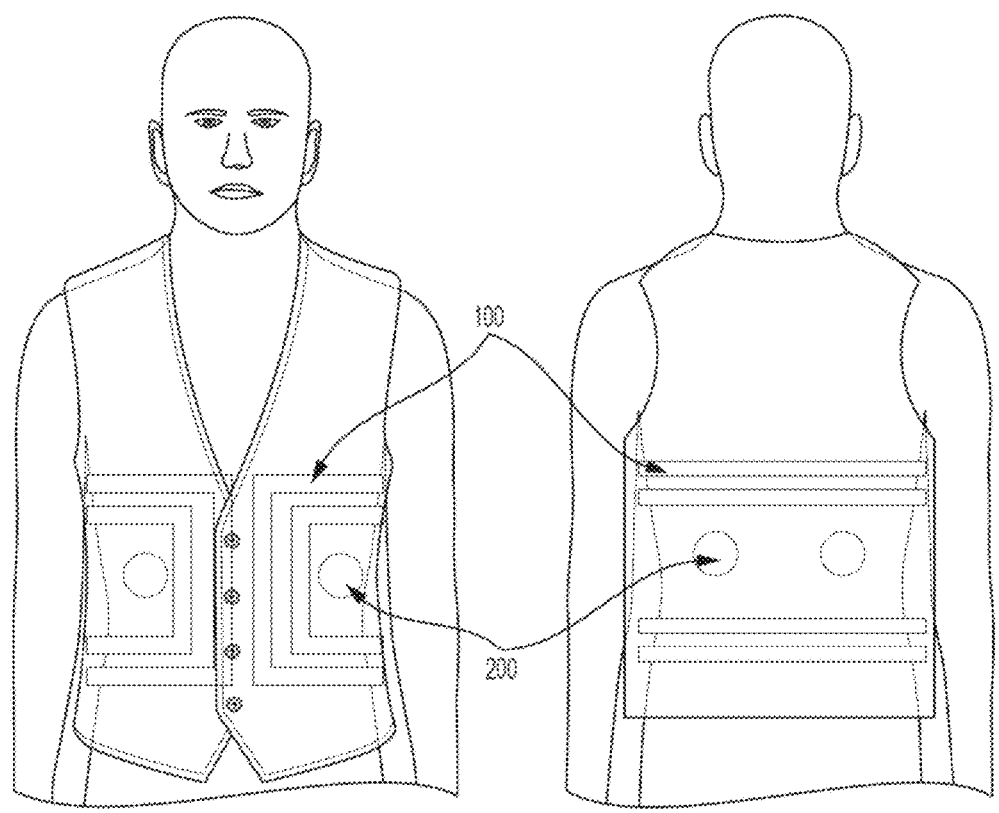

FIG. 9 shows a transmitter of a smart clothes system according to an embodiment of the subject invention, and FIG. 9(b) shows a transmitter and a receiver of a smart clothes system according to an embodiment of the subject invention. Referring to FIGS. 9(a) and 9(b), the transmitter 100 can be large such that the one transmitter integrated in the vest goes completely or nearly completely around a human body. In addition, the transmitter 100 can be large such that one transmitter 100 fully covers a plurality of receivers 200. The transmitter 100 can be flexible or curved according to a shape of a vest such that it goes completely or nearly completely around a human body.

Figure 10:
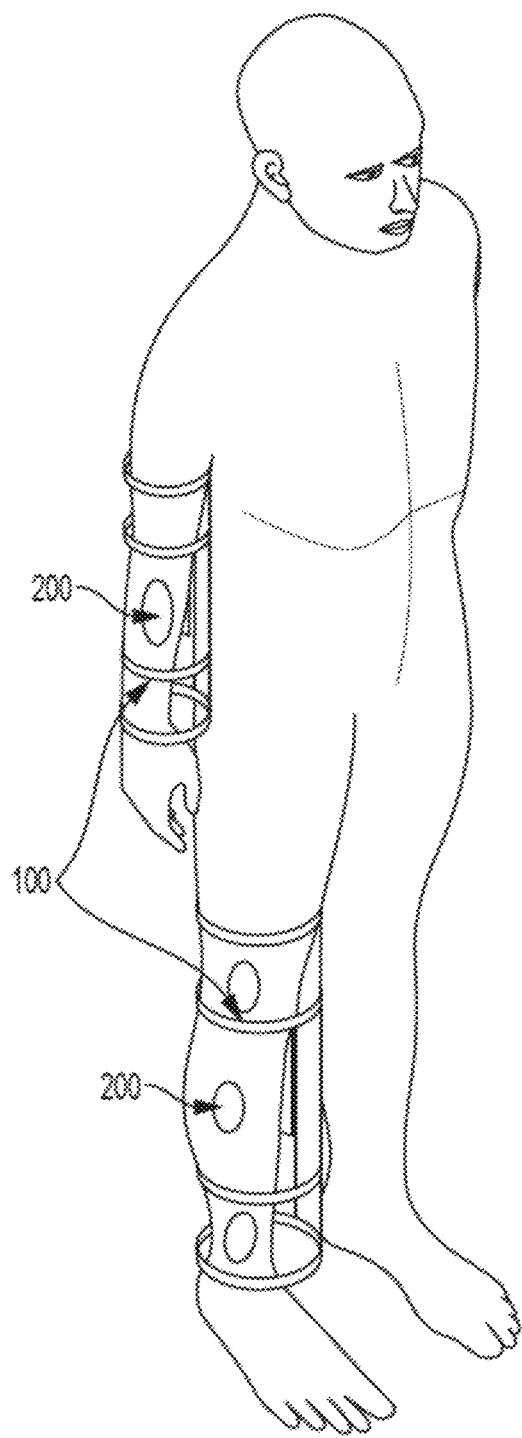
FIG. 10 shows a transmitter and a receiver according to an embodiment of the subject invention.

FIG. 10 shows a transmitter and a receiver according to an embodiment of the subject invention. Referring to FIG. 10, the receiver 200 is attached to an arm or a leg, and the transmitter 100 is located such that the transmitter 100 surrounds the arm or the leg. The transmitter 100 can be attached to a jacket or a wearable accessory configured to be located at the arm or the leg.

The smart clothes systems according to the embodiments of the subject invention have many applications including wearables, health, and vitals/diagnostics. In addition, smart clothes systems as disclosed herein can be used in hospital, military, and smart consumer wearables. The smart clothes system can include implantable devices. The smart clothes can include vests, jackets, pants, helmets, hats, shoes, wearable accessories, and other items, that are integrated with batteries and wireless power transmission and data elements (loops or cylindrical or 3D elements).

The subject invention includes, but is not limited to, the following exemplified embodiments.

Embodiment 1

A smart garment, comprising:
a substrate;
a source loop disposed on the substrate; and
a transmitter resonator disposed on the substrate,
the source loop and the transmitter resonator being disposed on the same plane of the substrate.

Embodiment 2

The smart garment according to embodiment 1, the source loop being positioned inside the transmitter resonator.

Embodiment 3

The smart garment according to any of embodiments 1 and 2, the source loop including a source loop end configured to be connected to a power source and the transmitter resonator including a transmitter resonator end configured to be connected to a capacitor.

Embodiment 4

The smart garment according to any of embodiments 1-3, the transmitter resonator including a first transmitter resonator disposed on the substrate and a second transmitter resonator disposed on the substrate, and the first transmitter resonator being positioned between the source loop and the second transmitter resonator.

Embodiment 5

The smart garment according to any of embodiments 1-4, further comprising a power source connected to a source loop end of the source loop, a first transmitter capacitor connected to a first transmitter resonator end of the first transmitter resonator, and a second transmitter capacitor connected to a second transmitter resonator end of the second transmitter resonator.

Embodiment 6

The smart garment according to any of embodiments 1-5, further comprising a dress configured to include the substrate and the power source, and the power source being a battery.

Embodiment 7

The smart garment according to embodiment 6, the substrate, the source loop, and the transmitter resonator being flexible such that the source loop and the transmitter resonator surround a human body according to the dress.

Embodiment 8

A smart clothes system, comprising:
a transmitter including a source loop, a first transmitter resonator surrounding the source loop, and a second transmitter resonator surrounding the first transmitter resonator; and
a receiver including a load loop spaced apart from the source loop, a first receiver resonator surrounding the load loop, and a second receiver resonator surrounding the first receiver resonator,
the transmitter being configured to face the receiver such that it transmits power and receives data.

Embodiment 9

The smart clothes system according to embodiment 8, the source loop, the first transmitter resonator, and the second transmitter resonator being disposed on the same plane as each other, and the load loop, the first receiver resonator, and the second receiver resonator being disposed on the same plane as each other.

Embodiment 10

The smart clothes system according to any of embodiments 8 and 9, further comprising a power source connected to the source loop and a load connected to the load loop.

Embodiment 11

The smart clothes system according to any of embodiments 8-10, further comprising a first transmitter capacitor connected to the first transmitter resonator, a second transmitter capacitor connected to the second transmitter resonator, a first receiver capacitor connected to the first receiver resonator, and a second receiver capacitor connected to the second receiver resonator.

Embodiment 12

The smart clothes system according to any of embodiments 8-11, one of the first and second transmitter resonators being configured to be used for the power and the other of the first and second transmitter resonators being configured to be used for the data.

Embodiment 13

The smart clothes system according to any of embodiments 8-12, one of the first and second receiver resonators being configured to be used for the power and the other of the first and second receiver resonators being configured to be used for the data.

Embodiment 14

The smart clothes system according to any of embodiments 8-13, the source loop, the first transmitter resonator, and the second transmitter resonator being concentric.

Embodiment 15

The smart clothes system according to any of embodiments 8-14, further comprising a sensor connected to the receiver and configured to be affixed on a body or implanted in the body.

Embodiment 16

The smart clothes system according to any of embodiments 8-15, further comprising a sticker configured to be attached on a body and including the receiver and a sensor connected to the receiver.

Embodiment 17

The smart clothes system according to any of embodiments 8-16, further comprising a vest including the power source.

Embodiment 18

The smart clothes system according to embodiment 17, the transmitter made of a single element and integrated in the vest.

Embodiment 19

The smart clothes system according to any of embodiments 8-18, the receiver comprising at least two receiver elements and the transmitter being configured to be large such that the transmitter covers the at least two receiver elements.

Embodiment 20

A smart clothes system, comprising:
a vest;
a plurality of transmitters attached to the vest;
a battery attached to the vest and supplying power to the plurality of transmitters;
a plurality of receivers configured to be attached to a body and facing the plurality of transmitters; and
a sensor connected to the plurality of receivers,
each of the plurality of transmitters comprising:
a transmitter substrate;
a source loop disposed on a top surface of the transmitter substrate;
a first transmitter resonator disposed on the top surface of the transmitter substrate; and
a second transmitter resonator disposed on the top surface of the transmitter substrate,
each of the plurality of receivers comprising:
a receiver substrate;
a load loop disposed on a top surface of the receiver substrate;
a first receiver resonator disposed on the top surface of the receiver substrate; and
a second receiver resonator disposed on the top surface of the receiver substrate,
the battery being connected to the source loop of each of the plurality of transmitters, and
the sensor being connected to the load loop of each of the plurality of receivers.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A smart garment, comprising:
a substrate;
a source loop disposed on the substrate and directly connected to a power source; and
a first transmitter resonator and a second transmitter resonator both disposed on the substrate,
the source loop, the first transmitter resonator, and the second transmitter resonator being disposed on the same plane of the substrate,
the first transmitter resonator being configured to transmit a power without direct connection with the power source, and
the second transmitter resonator configured to be used for data communication.

2. The smart garment according to claim 1, the source loop being positioned inside the transmitter resonator.

3. The smart garment according to claim 2, the source loop including a source loop end configured to be connected to a power source and the transmitter resonator including a transmitter resonator end configured to be connected to a capacitor.

4. The smart garment according to claim 2, the transmitter resonator including a first transmitter resonator disposed on the substrate and a second transmitter resonator disposed on the substrate, and the first transmitter resonator being positioned between the source loop and the second transmitter resonator.

5. The smart garment according to claim 4, further comprising:
a power source connected to a source loop end of the source loop;
a first transmitter capacitor connected to a first transmitter resonator end of the first transmitter resonator; and
a second transmitter capacitor connected to a second transmitter resonator end of the second transmitter resonator.

6. The smart garment according to claim 5, further comprising a dress configured to include the substrate and the power source,
the power source being a battery.

7. The smart garment according to claim 6, the substrate, the source loop, and the transmitter resonator being flexible such that the source loop and the transmitter resonator go around a human body.

8. A smart clothes system, comprising:
a transmitter including a source loop directly connected to a power source, a first transmitter resonator surrounding the source loop, and a second transmitter resonator surrounding the first transmitter resonator; and
a receiver including a load loop spaced apart from the source loop, a first receiver resonator surrounding the load loop, and a second receiver resonator surrounding the first receiver resonator,
the transmitter being configured to face the receiver such that it transmits power and receives data,
the first transmitter resonator being configured to transmit the power without direct connection with the power source, and
the second transmitter resonator configured to be used for data communication.

9. The smart clothes system according to claim 8, the source loop, the first transmitter resonator, and the second transmitter resonator being disposed on the same plane as each other, and
the load loop, the first receiver resonator, and the second receiver resonator being disposed on the same plane as each other.

10. The smart clothes system according to claim 9, further comprising
a load connected to the load loop.

11. The smart clothes system according to claim 10, further comprising:
a first transmitter capacitor connected to the first transmitter resonator;
a second transmitter capacitor connected to the second transmitter resonator, a first receiver capacitor connected to the first receiver resonator; and
a second receiver capacitor connected to the second receiver resonator.

12. The smart clothes system according to claim 10, one of the first and second receiver resonators being configured to be used for the power, and
the other of the first and second receiver resonators being configured to be used for the data.

13. The smart clothes system according to claim 10, the source loop, the first transmitter resonator, and the second transmitter resonator being concentric.

14. The smart clothes system according to claim 10, further comprising a sensor connected to the receiver and being configured to be affixed on a body or implanted in the body.

15. The smart clothes system according to claim 10, further comprising a sticker configured to be attached on a body and including the receiver and a sensor connected to the receiver.

16. The smart clothes system according to claim 10, further comprising a vest including the power source.

17. The smart clothes system according to claim 16, the transmitter being made of a single element and integrated in the vest.

18. The smart clothes system according to claim 10, the receiver comprising at least two receiver elements, and
the transmitter being configured to be large enough such that the transmitter covers the at least two receiver elements.

19. A smart clothes system, comprising:
a vest;
a plurality of transmitters attached to the vest;
a battery attached to the vest and supplying power to the plurality of transmitters;
a plurality of receivers configured to be attached to a body and facing the plurality of transmitters; and
a sensor connected to the plurality of receivers,
each of the plurality of transmitters comprising:
a transmitter substrate;
a source loop disposed on a top surface of the transmitter substrate and directly connected to a power source;
a first transmitter resonator disposed on the top surface of the transmitter substrate; and
a second transmitter resonator disposed on the top surface of the transmitter substrate, each of the plurality of receivers comprising:
a receiver substrate;
a load loop disposed on a top surface of the receiver substrate;

a first receiver resonator disposed on the top surface of the receiver substrate; and a second receiver resonator disposed on the top surface of the receiver substrate, the battery being connected to the source loop of each of the plurality of transmitters, the sensor being connected to the load loop of each of the plurality of receivers, the first transmitter resonator being configured to transmit a power without direct connection with the power source, and the second transmitter resonator configured to be used for data communication.

* * * * *